(12) United States Patent
Lin

(10) Patent No.: US 6,319,349 B1
(45) Date of Patent: Nov. 20, 2001

(54) PLASTIC TILES AND PROCESS FOR PREPARING THE SAME

(76) Inventor: Pao-Chin Lin, No. 96-1, Mei-Tzu Lane, Feng-Shih Rd., Shih-Kang Hsiang, Taichung Hsien (TW)

( * ) Notice: Subject to any disclaimer, the term of this patent is extended or adjusted under 35 U.S.C. 154(b) by 0 days.

(21) Appl. No.: 09/365,701

(22) Filed: Aug. 2, 1999

(51) Int. Cl.[7] ............................ B32B 31/12; B32B 31/22
(52) U.S. Cl. ..................... 156/209; 156/220; 156/278; 156/289
(58) Field of Search ............................. 156/71, 82, 184, 156/191, 199, 206, 209, 219, 220, 221, 269, 278, 289, 331.7; 427/355, 154, 155; 118/45; 428/40.1, 41.7, 41.8, 45, 44, 47, 49, 95

(56) References Cited

U.S. PATENT DOCUMENTS

| | | | |
|---|---|---|---|
| 4,196,243 | * 4/1980 | Sachs et al. | 428/147 |
| 4,211,810 | * 7/1980 | Barta | 428/201 |
| 4,678,528 | * 7/1987 | Smith et al. | 156/220 |
| 5,304,272 | * 4/1994 | Rohrbacker et al. | 156/209 |
| 5,401,348 | * 3/1995 | Oguchi et al. | 156/247 |

* cited by examiner

Primary Examiner—Richard Crispino
Assistant Examiner—Cheryl N. Hawkins
(74) Attorney, Agent, or Firm—Ladas & Parry

(57) ABSTRACT

A process for the preparation of plastic tiles includes the steps of (a) preparing a plastic substrate, (b) providing a pattern layer on a plastic skin layer, (c) applying a varnish coating to the pattern layer, (d) covering a releasable paper on the varnish coating before the varnish coating becomes dry, (e) removing the releasable paper from the varnish coating after the varnish coating becomes dry, and (f) bonding together and embossing, after step (d), the varnish coating, the pattern layer, the skin layer, and the plastic substrate to form a laminate with an embossed surface.

10 Claims, 3 Drawing Sheets

PLASTIC TILES AND PROCESS FOR PREPARING THE SAME

BACKGROUND OF THE INVENTION

1. Field of the Invention

This invention relates to plastic tiles and process for preparing the same, more particularly to laminated plastic floor tiles with embossed surfaces and process for preparing the same.

2. Description of the Related Art

FIG. 1 illustrates a piece of a conventional polyvinyl plastic floor tile. The tile includes a substrate 1, a white-colored polyvinyl skin layer 2 laid on the substrate 1, a pattern layer 3 printed on the skin layer 2, and a transparent layer 4 covering the pattern layer 3 for protecting the pattern layer 3 from damage. The patterned skin layer 2 and the transparent layer 4 are laid on the substrate 1, and are laminated and embossed via hot-pressing or calendering means to form the tile. Due to poor heat and wear resistance properties, the transparent layer 4 of the tile has to be protected via a surface treatment to provide the transparent layer 4 with a high gloss and high abrasion resistant coating 5 that is dried via ultra-violet radiation. However, the coating 5 flattens the embossed surface of the tile, thereby reducing the desired aesthetic embossment and anti-slip effects of the tile.

SUMMARY OF THE INVENTION

Therefore, it is an object of the present invention to provide plastic tiles and process for preparing the same that is capable of overcoming the disadvantages described above.

According to one aspect of this invention, a process for the preparation of plastic tiles of the present invention comprises the steps of: (a) preparing a plastic substrate, (b) providing a pattern layer on a plastic skin layer; (c) applying a varnish coating to the pattern layer; (d) covering a releasable paper on the varnish coating before the varnish coating becomes dry; (e) removing the releasable paper from the varnish coating after the varnish coating becomes dry; and (f) bonding together and embossing, after step (e), the varnish coating, the pattern layer, the skin layer, and the plastic substrate to form a laminate with an embossed surface.

According to another aspect of this invention, a polyvinyl chloride comprises a white-colored polyvinyl chloride sheet coated with a pattern layer, a varnish coating applied to said pattern layer, and a releasable paper covering said varnish coating, wherein said releasable paper covers said varnish coating before said varnish coating becomes dry.

According to still another aspect of this invention, a process for the preparation of plastic tiles, comprising the steps of: (a) preparing a plastic substrate; (b) providing a pattern layer between a plastic skin layer and a plastic transparent layer; (c) applying a varnish coating to the transparent layer; (d) covering a releasable paper on the varnish coating before the varnish coating becomes dry; (e) removing the releasable paper from the varnish coating after the varnish coating becomes dry; and (f) bonding together and embossing, after step (e), the varnish coating, the transparent layer, the pattern layer, the skin layer, and the plastic substrate to form a laminate with an embossed surface.

According to still another aspect of this invention, a polyvinyl chloride skin for plastic tiles, comprising a transparent polyvinyl chloride sheet coated with a varnish coating, and a releasable paper covering the varnish coating, wherein the releasable paper covers the varnish coating before the varnish coating becomes dry.

BRIEF DESCRIPTION OF THE DRAWINGS

In drawings which illustrate embodiments of the invention.

DETAILED DESCRIPTION OF THE PREFERRED EMBODIMENTS

Figure 1:
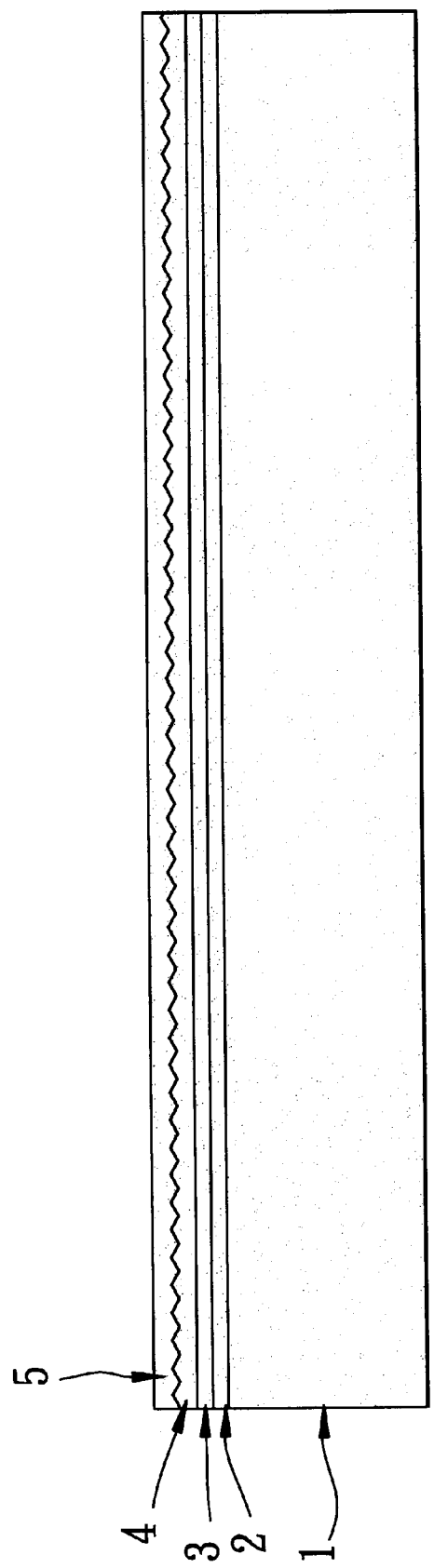
FIG. 1 is a schematic side view of a laminate produced by a conventional process for making plastic floor tiles.
Figure 2:
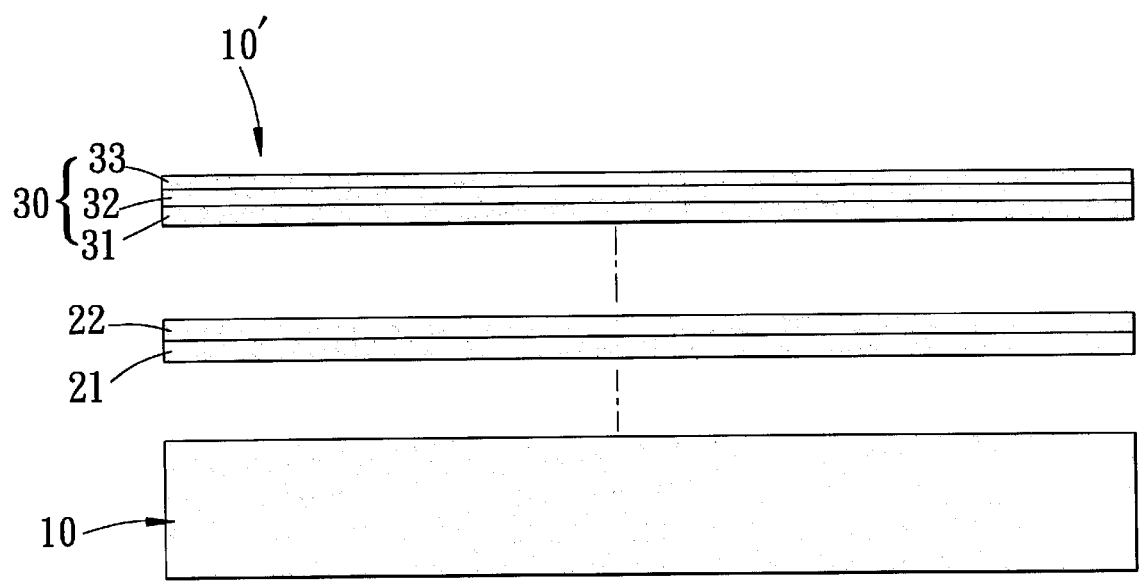
FIG. 2 is a schematic side view of a laminate prepared by a process embodying this invention for making plastic tiles.

FIG. 2 illustrates a laminate 10' prepared by a process embodying this invention for producing plastic tiles. The laminate 10' includes a layer of a polyvinyl chloride substrate 10 with a thickness of 1 to 2.5 mm, a polyvinyl chloride skin layer 21, and a protecting layer 30. The skin layer 21 is printed with a pattern layer 22. According to a preferred embodiment of this invention, the substrate, the skin layer, and the protecting layer may be preformed separately.

The protecting layer 30 contains a polyvinyl chloride transparent sheet 31 coated with a layer of varnish coating 32, and a releasable paper 33 covered on the varnish coating 32 before the latter becomes dry.

Figure 3:
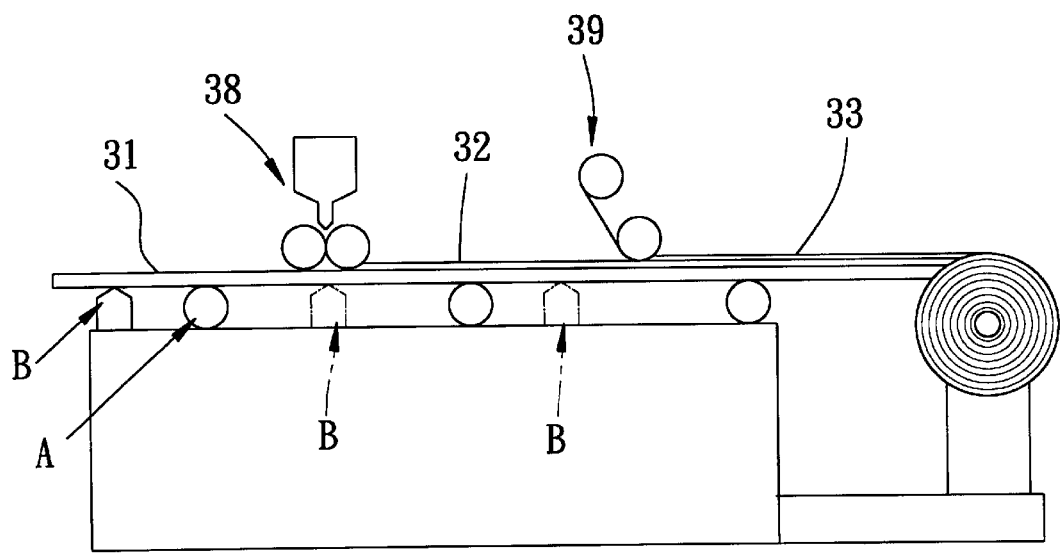
FIG. 3 is a schematic side view of an apparatus used in the process of the invention.

As illustrated in FIG. 3, in the process of this invention, the preformed transparent sheet 31 is transported via a conveyor (A). Then, the varnish coating 32 is applied to the transparent sheet 31 via a coating device 38. The varnish coating 32 on the transparent sheet 31 is subsequently covered, before the varnish coating 32 becomes dry, with the releasable paper 33 by passing the coated transparent sheet 31 through a releasable paper supplying device 39. The releasable paper 33 prevents the surface of the transparent sheet 31 from being wrinkled and deformed due to a shrinking effect caused by the drying of the varnish coating 32.

Figure 4:
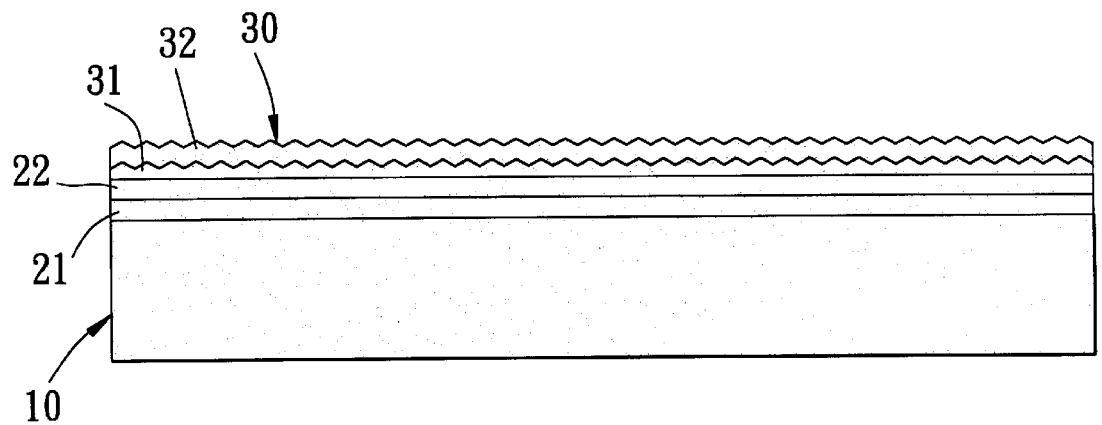
FIG. 4 is a schematic side view of a plastic tile produced by a process according to the present invention.

After the varnish coating 32 becomes substantially dry, the releasable paper 33 is removed therefrom, and the protecting layer 30 and the skin layer 21 are bonded to the substrate 10 to form the laminate 10' with an embossed surface via hot-pressing or calendering means. An embossed plastic tile obtained after cutting the laminate 10' is shown in FIG. 4. It is apparent to one skilled in the art that the pattern layer 22 can be printed either on the skin layer 21 or on the transparent sheet 31 via a printing device (B) shown in FIG. 3.

Figure 5:
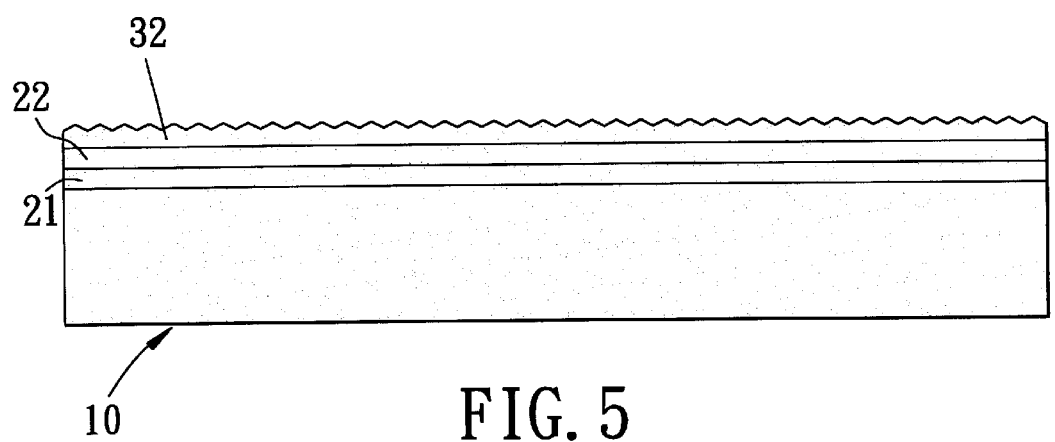
FIG. 5 is a schematic side view of a plastic tile prepared by another process according to this invention.

Another embodiment of the process of this invention is substantially similar to the previous embodiment, except that the varnish coating 32 is applied directly to the skin layer 21 in this embodiment without providing the transparent sheet 31. A releasable paper is also used in this embodiment before the varnish coating 32 becomes dry. FIG. 5 illustrates the embossed plastic tile of this embodiment.

The varnish coating 32 used in this invention is selected from the group consisting of a solvent-based polyurethane coating, a water-based polyurethane coating, an epoxy coating, an unsaturated polyester coating, and a latex coating. The varnish coating 32 may be added with mineral sand or plastic particles for enhancing the resistance to wearing, and with adhesive for enhancing the adhesion of the varnish coating.

With the invention thus explained, it is apparent that various modifications and variations can be made without departing from the spirit of the present invention. It is therefore intended that the invention be limited only as recited in the appended claims.

I claim:

1. A process for the preparation of plastic tiles, comprising the steps of:
   (a) preparing a plastic substrate;
   (b) providing a pattern layer on a plastic skin layer;
   (c) applying a varnish coating to said pattern layer;
   (d) covering a releasable paper on said varnish coating before said varnish coating becomes dry;
   (e) removing said releasable paper from said varnish coating after said varnish coating becomes dry; and
   (f) bonding together and embossing, after step (e), said varnish coating, said pattern layer, said skin layer, and said substrate to form a laminate with an embossed surface.

2. The process of claim 1, further comprising cutting said laminate into pieces.

3. The process of claim 1, wherein said plastic skin layer and said substrate are made of polyvinyl chloride.

4. The process of claim 1, wherein said varnish coating is selected from the group consisting of a solvent-based polyurethane coating, a water-based polyurethane coating, an epoxy coating, an unsaturated polyester coating, and a latex coating.

5. The process of claim 1, wherein said varnish coating contains solid particles therein.

6. The process of claim 5, wherein said particles are made of plastic.

7. The process of claim 5, wherein said particles are made of mineral.

8. A process for the preparation of plastic tiles, comprising the steps of:
   (a) preparing a plastic substrate;
   (b) providing a pattern layer between a plastic skin layer and a plastic transparent layer;
   (c) applying a varnish coating to said transparent layer;
   (d) covering a releasable paper on said varnish coating before said varnish coating becomes dry;
   (e) removing said releasable paper from said varnish coating after said varnish coating becomes dry; and
   (f) bonding together and embossing, after step (e), said varnish coating, said transparent layer, said pattern layer, said skin layer, and said plastic substrate to form a laminate with an embossed surface.

9. The process of claim 8, wherein said pattern layer is printed on said skin layer.

10. The process of claim 8, wherein said pattern layer is printed on said transparent layer.

* * * * *